O. KREMS.
INTEREST COMPUTER.
APPLICATION FILED SEPT. 14, 1920.

1,426,484.

Patented Aug. 22, 1922.
2 SHEETS—SHEET 1.

Inventor
Otto Krems
by Wilkinson
& Ginsta
Attorneys

O. KREMS.
INTEREST COMPUTER.
APPLICATION FILED SEPT. 14, 1920.

1,426,484.

Patented Aug. 22, 1922.
2 SHEETS—SHEET 2.

Inventor
Otto Krems
by Wilkinson & Giusta
Attorneys.

UNITED STATES PATENT OFFICE.

OTTO KREMS, OF INNSBRUCK, TIROL, AUSTRIA.

INTEREST COMPUTER.

1,426,484.  Specification of Letters Patent.  Patented Aug. 22, 1922.

Original application filed October 31, 1919, Serial No. 334,905. Divided and this application filed September 14, 1920. Serial No. 410,274.

(GRANTED UNDER THE PROVISIONS OF THE ACT OF MARCH 3, 1921, 41 STAT. L., 1313.)

*To all whom it may concern:*

Be it known that I, OTTO KREMS, a citizen of Austria, residing at Innsbruck, Tirol, Austria, have invented certain new and useful Improvements in Interest Computers (for which I have filed applications in Austria, October 18, 1918; in Germany, October 28, 1918; in Sweden, December 18, 1919; in Denmark, December 31, 1919; in Norway, January 7, 1920; in Holland, February 17, 1920; in Poland, February 18, 1920; and in Italy, June 30, 1920); and I do hereby declare the following to be a full, clear, and exact description of the invention, such as will enable others skilled in the art to which it appertains to make and use the same.

This invention relates to that class of interest computers in which the total amount of interest for a given rate of interest, a given period of time and a given capital is found by summing up a series of numbers representing the interests for the same rate of interest and the same period of time of the summands represented by the various places of the number indicating the total capital sum.

The chief object of my invention is to avoid errors. This application is a division of my application filed October 31st 1919, Serial No. 334,905.

Figure 1:
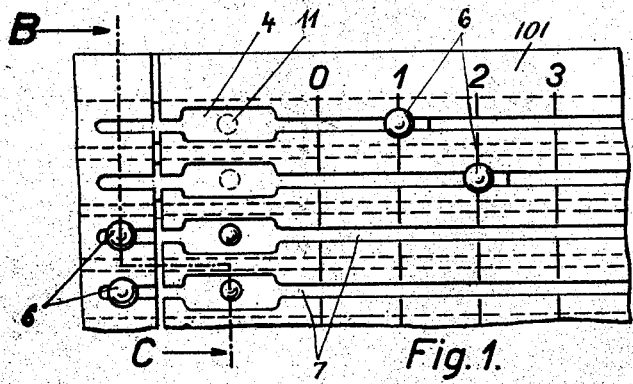
Figure 2:
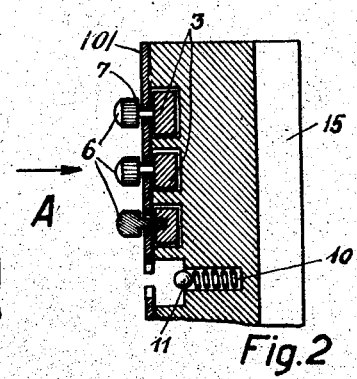
Figure 3:
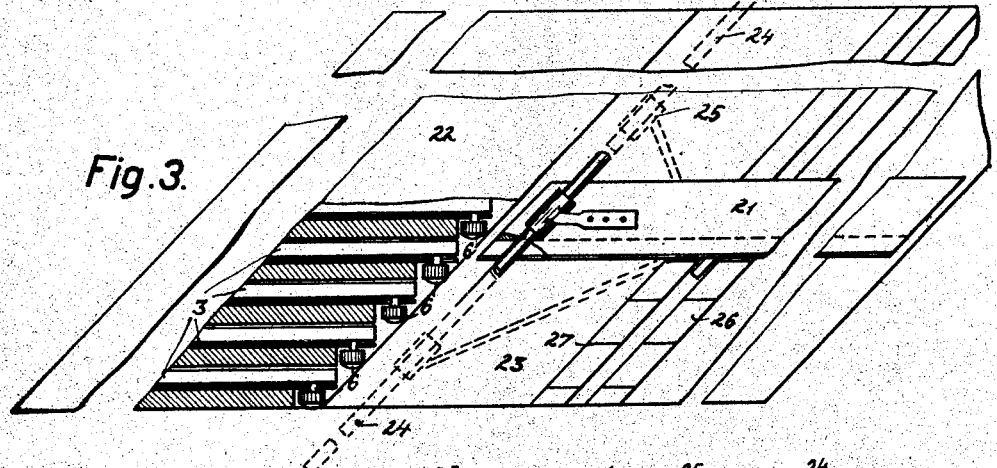
Figure 4:
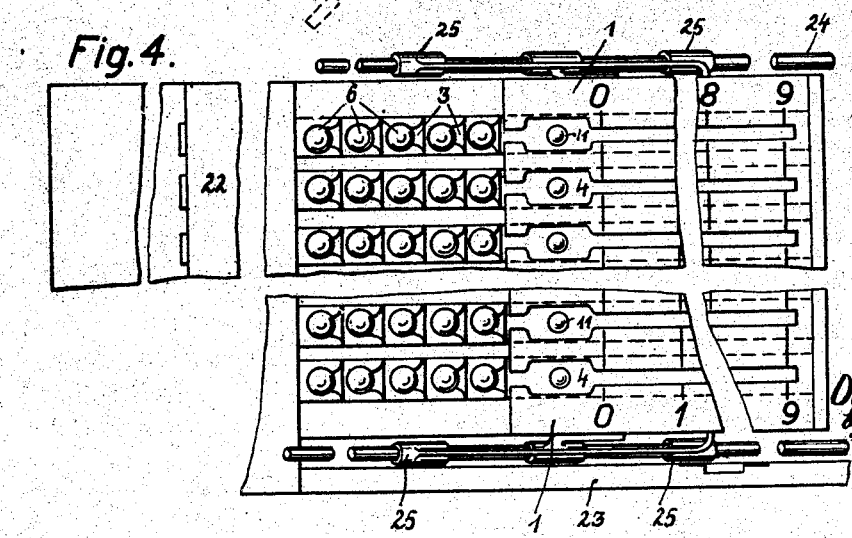
Figure 7:
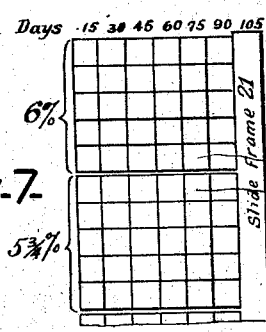
Figure 8:
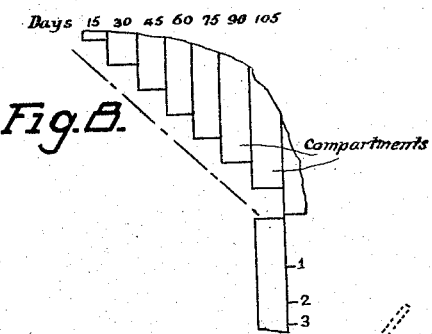
Figure 5:
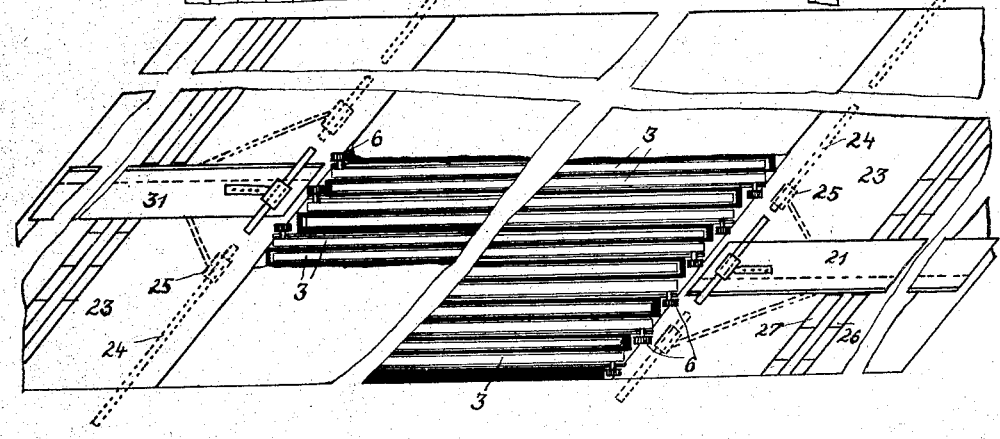
Figure 6:
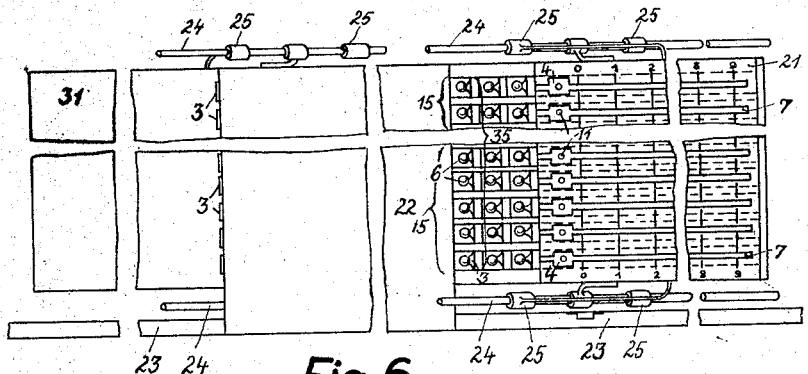

In the accompanying drawings Fig. 1 is a front elevation as viewed in the direction of arrow A, Fig. 2 is a section on line B, C, Fig. 1, of part of my improved interest computer. Figs. 3 and 4 are a plan view and a front elevation of one constructional form of the entire interest computer and Figs. 5, 6 are similar views of another constructional form thereof. Fig. 7 is a top plan view showing two adjacent compartments in connection with a slide and the denomination sections, and Fig. 8 is a fragmentary side view thereof.

Referring more particularly to Figs. 1 and 2, 1 is a guide block, the front face of which is preferably in a vertical plane. The guide block is provided with a plurality of shelves dividing it into a number of guides—in the example shown in Figs. 1 and 2 into four guides and a fifth fragmentary guide—equal to the number of places of the highest sum of capital for which the apparatus is designed (in the example shown 99999). 101 is a cover plate covering the front side of the guides, 7 are longitudinal slots in a cover plate provided near one end with enlargements or openings 4. 15 is a compartment of a box divided by horizontal shelves into horizontal guides equal in number to and in line with the guides in the guide block 1. 3 are slides normally contained in the guides in the compartment 15 but adapted to be pushed by means of knobs 6 suitably attached thereto into the guides in the guide block 1. The guides in the compartment 15 are marked with "ten thousands", "thousands", "hundreds", "tens", and "units" to correspond to the place value of the slides normally contained in these guides are designed. On the cover plate 101 of the guide block there are drawn nine transverse lines marked 1 ... 9 and the slides are marked with figures giving the interests for a given period of time and a given rate of interest of capital the amount of which is consecutively equal 1, 2, ... 9 times the place value for which the slide is used the arrangement being such that when any slide, say the thousands slide is pushed from its guide in the compartment 15 into the corresponding guide in the guide block 3, (the latter guide being exactly opposite and in time with the former guide in the compartment 15) until the knob 6 of such slide (the thousands slide) is brought onto any of the transverse lines 1 to 9 on the cover plate 101 of the guide block 11 (say onto the line 5), the figure (79,687 as shown) of this slide then exhibited through the opening 4 of the corresponding guide in the guide block gives the interest of a sum of capital, the value of which is as many times (5 times) the place value (thousands) for which the slide is used, as indicated by the number of the transverse line, so that the figure 79,687 shown in Fig. 1 is the interest of a sum of $5000 for the given time and rate of interest.

Assuming that the interest of a sum of $45,000 at 4¼% for 4½ months (135 days) has to be computed then slides are made use of which show figures corresponding to 4¼% and 135 days. The ten thousands slide is pushed into its guide in the block 1 and along the same until its knob 6 is on the transverse line 4, the knob of the thousands slide is adjusted in the same way in its guide in the guide block to the transverse line 5 while the hundreds, the tens and the units slides are left at rest in their respective guides in the compartment 15 as shown in Figs. 1 and 2 and the figures 637,500 and 79,687 respectively of the consecutive slides then appearing in front of the corresponding openings are summed up giving $717.19 as the 4¼% interest for 135 days of the capital of $45,000.

The slides are preferably kept in their adjusted position by suitable catches such as balls 11 acted upon by springs 10 located in the block 1 and engaging into recesses on the back of the slides.

In order to adapt the interest computer for different rates of interest and different periods of time I arrange according to my present invention as shown in Figs. 3 and 4 a plurality of guide blocks 1 constructed as above described the one above the other in a vertical slide frame 21 adapted to move along one side of a box 22 on a base plate 23, this slide frame being guided by sleeves 25 fastened to the same and engaging guide rods 24 fastened to the box 22.

The box 22 is subdivided into compartments 15 arranged in vertical and horizontal series each of such compartments being constructed and containing slides 3 as above described. The slides in the compartments of a vertical series are marked with figures corresponding to different rates of interest but to the same period of time throughout, thus for instance the slides in the first vertical series of compartments in the box 22 show in the order from top to bottom the 5% interest, of ten thousands, thousands, hundreds, tens and units, then the 4¼% interest for ten thousands, thousands, hundreds, tens and units and so on all for 1 day. The next following vertical series of compartments contains slides marked with figures corresponding to the same rates of interest (5%, 4¾% and so on) but for 2 days throughout, the slides in the third vertical series of compartments are marked with figures corresponding to the said rates of interest but for 3 days and so on. The slides in a horizontal series of compartments of the box 22 are marked with figures corresponding to the same rate of interest throughout, but to different periods of time; thus for instance for the uppermost horizontal series of compartments the 5% interest throughout the series for 1, 2, 3, etc., days.

The guides in the compartments of the box 22 are open at the side of the box along which the slide frame 21 is adapted to move.

Preferably the number of superposed blocks 1 in the slide frame is equal to the number of compartments 15 in a vertical series in the box 22, the arrangement being such that when the slide frame 21 is brought in front of any of the vertical series of compartments in the box 22 each of the guides in the guide blocks in the slide frame is opposite to and in line with a guide in the said vertical series of compartments.

Assuming now the 4¼% interest of a sum of $45789 for 135 days has to be computed then the slide frame 21 is moved along the side of the box 22 until it has been adjusted to the period of 135 days and thus opposite the vertical series of compartments in the box 22 corresponding to 135 days. This adjustment may be facilitated by providing a scale 27 properly divided and marked on the base plate 23. Then the slides of the 4¼% compartment in the vertical series in the box 22 are pushed by means of their knobs into the guides in the corresponding block 1 in the slide frame also marked 4¼% and adjusted therein as hereinbefore described. By summing up the figures then appearing in front of the openings 4 of this block the sum $729.76 is obtained which is the interest sought.

Besides the scale 27 giving the periods of time another scale 26 may be provided, which gives dates in such a manner that the numbers on the scale 27 give the days (or other periods of times, such as fortnights) counted from the corresponding date on the scale 26 up to a predetermined fixed date, for instance from the first named running date to the end of a semester or year. By simply adjusting the slide frame 21 on the scale 26 to the running date it will also be adjusted to the corresponding period of time indicated on the scale 27 whereby the necessity of determining the period of time from dates and errors consequent thereupon are avoided. Suitable catches may be provided on the slide block 21 for temporarily holding it in any adjusted position.

In order to make the knobs 6 of the slides in the box 22 readily accessible and to facilitate the finding out and handling of any individual slide the box 22 has for its base an oblique parallelogram as shown in Fig. 3, the slides 3 contained therein and the slide frame 21 being parallel to one of the sides of the box 22 and forming an oblique angle with the other side thereof from which the slides are pushed into the guide blocks 1. Thereby all the knobs 6 are visible at a time and may be taken hold of individually without interfering with other knobs or slides as the knob end of any slide projects beyond the knob end of slides in preceeding vertical series of compartments as is clearly seen from Fig. 3.

In this construction the depth of each compartment in the box must be made greater than the thickness of the slide plus the height of the knob in order that the slides may not interfere with each other and this increases the space occupied by the box 22 for a given number of compartments and a given size of the slides.

In Figs. 5 and 6 a modification of my apparatus is shown which permits two persons to use the same simultaneously without at the same time unduly increasing the space occupied by the box 22.

In this case there are provided in the slide box 22 two systems of compartments and two independent slide frames 21, 31 one on each of two opposite sides of the box. One of the systems of compartments belongs to and opens towards the slide frame 21 and the other towards the other slide frame 31. The vertical series of compartments of one system alternate with those of the other so that one vertical series of compartments belongs to one system and one slide frame 21 and the next one 35 to the other system and slide frame 31. Otherwise the construction and arrangement is more particularly of the slide frames and their blocks 1 substantially the same as in Figs. 3 and 4. The period of time for all the slides in a vertical series in the slide box is the same throughout.

In using the apparatus shown in Figs. 4 and 5 each of the slide frames 21, 31 may be adjusted independently for any given period of time and then the required slides may be pushed from the corresponding compartment of the box into the same as above described. Even if both slide frames were as nearly opposite each other as possible and slides of compartments in the same level (as for the same rate of interest) would have to be pushed into both slide frames, the one attendant would not interfere with the other because the slides for the two slide frames are in different compartments 15, 35. By this arrangement not only the working capacity of the apparatus is doubled but also the manipulation is greatly facilitated because the height of the knobs is notably increased, all other things being equal as compared with the construction shown in Figs. 3 and 4.

The apparatus consists of a stationary box, divided into compartments parallel to each other and to the base and one of the walls (the front wall) of the box. A plurality of such compartments is superposed vertically, each of such compartments corresponding to one rate of interest, say from 2% rising by increments of ¼% to 6% from bottom to top, and a plurality of such compartments is arranged on the same level, the one behind the other in a direction from front to back, the various compartments in each of these horizontal series corresponding to a given rate of interest but to different periods of time say from 15 days to six months rising by increments of 15 days from front to back. Each compartment consists of a plurality of superposed guides say five in number for units, tens, hundreds, thousands and ten thousands of the capital sum. Each of these guides contains a slide having inscribed thereon the amount of interest for a sum of capital of 1, 2, .... 9 times the place value corresponding to the particular guide of the compartment and to the rate of interest and period of time corresponding to the position occupied by the compartment under consideration in the box, and further the apparatus consists of a slide frame (21) adapted to move horizontally only along that side of the box on which the guides in the compartments open. This slide frame which is adapted to be brought in front of the open end and of any of the vertical series of compartments of the box is provided with vertically superposed guide blocks equal in number to the superposed compartments of a vertical series in the box, each of such guide blocks having a plurality of guides at one end equal in number to the number of guides in the compartments. The whole is so arranged that when the slide frame 21 is brought in front of any of the vertical series of compartments in the box, the guides in the guide blocks of the slide frame have their open ends opposite the open ends of the guides in the compartments of the box and in proximity thereto and the corresponding guides in the guide blocks and in the compartments are in line with each other so that the slide of the guide in a compartment of the box may be pushed into the corresponding guide of a guide block in the slide frame.

The modification shown in Figs. 5 and 6 consists merely in duplicating the vertical series of compartments in the box, one of such vertical series having their open ends at one and the other at the other side of the box, and each cooperating in exactly the manner above set forth with a separate slide frame provided on the corresponding side of the box. Thereby the distance between the slide actuating knobs of consecutive vertical series of compartments cooperating with one slide frame is doubled and the apparatus is more convenient for handling permitting at the same time the use of the apparatus by two attendants independently the one from the other. The scales 26 and 27 are structurally identical, only their numbering is different; the one serves for computing postnumerando and the other for computing anticipando interest.

The mechanical details of construction of the apparatus may be varied within wide limits, without departing from the essence of my invention.

I claim:

In an interest computer the combination of a box having a base in the shape of an oblique parallelogram and subdivided into compartments arranged in vertical and horizontal series, guides in such compartments parallel to the base and one side of the box, such guides being open at one of the other sides of the box, slides adapted to move in such guides, a slide frame, vertical guide blocks equal in number to the compartments in a vertical series in the box in such slide frame and guides in such guide blocks such guides being open at the end next to the side of the box where the guides in the latter are open and their number in each guide block being equal to the number of guides in each compartment and the guides in the guide block being adapted to receive and guide the said slides, means for moving the slide frame along that side of the box where the guides in the compartments open whereby a guide block can be brought in front of any compartment of a horizontal series in the box, the guides in the compartment and in the guide block being in line with and opposite each other and means for pushing the slides in the compartments in the guides from the guides in the guide blocks and for adjusting them in the latter substantially as and for the purpose described.

OTTO KREMS.